United States Patent
Maeda

(10) Patent No.: US 6,204,898 B1
(45) Date of Patent: Mar. 20, 2001

(54) LIQUID CRYSTAL DISPLAY AND ELECTRONIC DEVICE

(75) Inventor: Tsuyoshi Maeda, Yamanashi-ken (JP)

(73) Assignee: Seiko Epson Corportion (JP)

( * ) Notice: Subject to any disclaimer, the term of this patent is extended or adjusted under 35 U.S.C. 154(b) by 0 days.

(21) Appl. No.: 09/227,772

(22) Filed: Jan. 8, 1999

(51) Int. Cl.$^7$ ................................................ G02F 1/1335
(52) U.S. Cl. ................................. 349/63; 349/58; 349/65
(58) Field of Search ................................. 349/61, 62, 63, 349/65, 122, 155, 58; 362/31

(56) References Cited

U.S. PATENT DOCUMENTS

| | | | |
|---|---|---|---|
| 5,341,231 | * 8/1994 | Yamamoto et al. | 359/49 |
| 5,375,005 | * 12/1994 | Komano | 359/48 |
| 5,555,109 | * 9/1996 | Zimmerman et al. | 359/40 |
| 5,581,380 | * 12/1996 | Bergman | 349/63 |
| 5,631,756 | * 5/1997 | Itazawa | 349/58 |
| 5,659,376 | * 8/1997 | Uehara et al. | 349/58 |
| 5,808,707 | * 9/1998 | Niibori et al. | 349/60 |

* cited by examiner

Primary Examiner—James A. Dudek
(74) Attorney, Agent, or Firm—Harness, Dickey & Pierce, P.L.C.

(57) ABSTRACT

In a front light type liquid crystal display device, to prevent a reduction in the quality of a visible image to be displayed caused by dust entering the liquid crystal display device. To prevent a reduction in the quality of a visible image to be displayed caused by ununiform close contact between the light-guiding member and another member of the liquid crystal display device. A liquid crystal display device 21 including a liquid crystal structure 6 consisting of a pair of substrates 17a and 17b with liquid crystal L filled therebetween; a light source 2 which emits light; a light-guiding member 3, disposed at the observer side of the liquid crystal structure 6, for guiding the light from the light source 2 to the liquid crystal structure 6; and a cover 23 disposed at the observer side of the light-guiding member 3. A first spacer member 12 is disposed between the light-guiding member 3 and the liquid crystal structure 6 at the peripheral portions thereof so as to be in close contact with the light-guiding member 3 and the liquid crystal structure 6, and a second spacer member is disposed between the light-guiding member 3 and the cover 23 at the peripheral portions thereof so as to be in close contact with the light-guiding member 3 and the cover 23. The spacer members 12 and 22 prevent the entry of dust between the liquid crystal structure 6 and the light-guiding member 3 and between the light-guiding member 3 and the cover 23, and can be used to eliminate the problem of ununiform close contact between these component parts.

34 Claims, 9 Drawing Sheets

Fig. 9
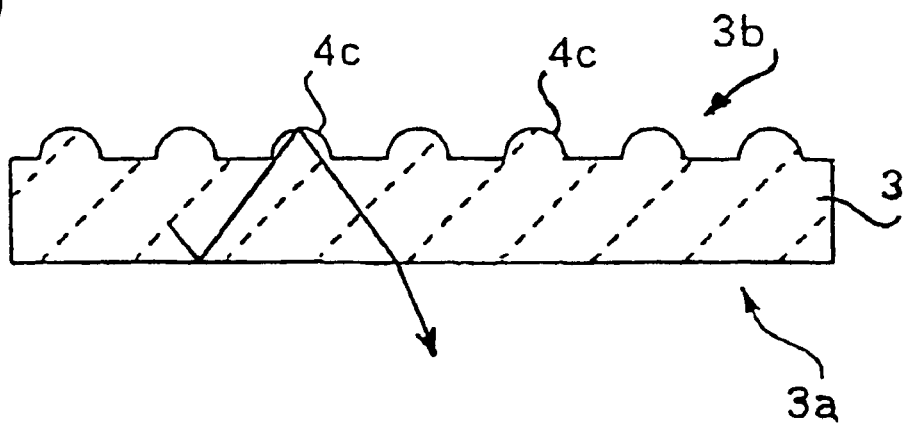
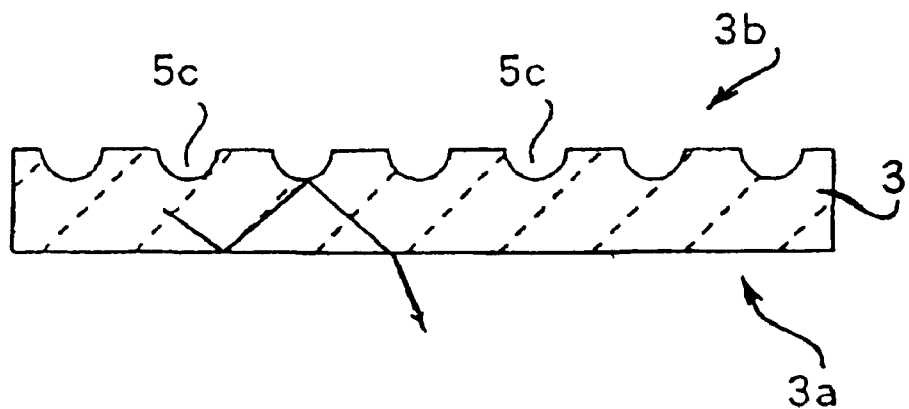
Fig. 10

LIQUID CRYSTAL DISPLAY AND ELECTRONIC DEVICE

1. Technical Field

The present invention relates to a liquid crystal display device which displays visible information, such as numbers or characters, using liquid crystal filled between a pair of substrates. The present invention also relates to an electronic device employing such a liquid crystal display device as a visible image display portion.

2. Discussion

In recent years, liquid crystal display devices have been widely used as a visible image display portion of various electronic devices, such as portable telephones and portable information terminals. A known type of conventional liquid crystal device comprises a liquid crystal structure consisting of a pair of substrates with liquid crystal filled therebetween, and an illuminator for illuminating the liquid crystal structure with light. Another known type of conventional liquid crystal device is the so-called transreflective liquid crystal display device which is capable of reflecting and transmitting light.

The transreflective liquid crystal display device comprises a semitransmissive type light reflecting plate at the back side of the aforementioned liquid crystal structure and an illuminator, which are disposed successively. When the transreflector liquid crystal display device is used in places which get a lot of outside light, such as outdoors, it is used as a reflective liquid crystal display device, since the illuminator is not used. When the transreflective liquid crystal display device is used in places which get only a small amount of outside light, it is used as a transmissive liquid crystal display device, since the illuminator device is used and turned on. Such a transreflector liquid crystal display device is disclosed in, for example, Japanese Unexamined Patent Publication No. 57-049271.

Compared to the so-called reflective liquid crystal display device which displays information by disposing only a light reflecting plate at the back side of the liquid crystal structure and using only outside light, the transreflective liquid crystal display device has the problem that the display becomes dark when information is displayed by reflection. This is because in such a transflective liquid crystal display device light transmission is achieved by making the reflective layer, such as an Al (aluminum) layer, of the light reflecting plate thin, or forming an opening, for allowing light transmission, in the reflecting layer, so that the brightness of the display obtained by reflection is sacrificed.

In addition, since in the conventional transreflector liquid crystal display device the illuminator that is disposed at the back side of the liquid crystal structure illuminates the liquid crystal structure through a semitransmissive reflecting plate, a very bright light source is required to illuminate the liquid crystal structure brightly, resulting in large electrical power consumption.

To overcome this problem, the applicant, in Japanese Unexamined Patent Publication No. 6-324331, has disclosed a so-called front light type liquid crystal display device that has an illuminator disposed at the observer side of the liquid crystal structure. For example, as shown in FIG. 14, the front light type liquid crystal display device includes an illuminator 7 disposed at the observer side (the top side in FIG. 14) of the liquid crystal structure 6 consisting of a pair of substrates with liquid crystal filled therebetween; and a light reflecting plate 8 that is disposed at the side opposite to the observer side of the liquid crystal structure 6. The illuminator 7 includes, for example, a light source 2, a transmissive light-guiding member 3 with protrusions 4a, and a side face reflecting plate 10. As shown in FIG. 13, the protrusions 4a are disposed in a regular or irregular dot arrangement on a surface of the light-guiding member 3.

This liquid crystal display device is used as a reflective liquid crystal display device when it is used in places which get a lot of outside light, such as outdoors, and as a transmissive liquid crystal display device when it is used in places which get only a small amount of outside light. In the former case, information is displayed by transmission of outside light through the transmissive light-guiding member 3, and in the latter case, information is displayed by using illuminating light of the light source 2. When the liquid crystal display device is used as a reflective liquid crystal display device, light beams from the light source 2 take the paths indicated by S1 and S2 of FIG. 14, so that they propagate through the light-guiding member 3 as they undergo total reflection, and arrive at side faces of corresponding protrusions 4a, after which they leave the light-guiding member 3 and illuminate the liquid crystal structure 6. When such a front light type illuminator 7 is used, a semitransmissive light reflecting plate is not required, thereby allowing a bright display to be provided by light reflection.

However, the conventional liquid crystal display device of FIG. 14 allows dust to easily enter between the liquid crystal structure 6 and the light-guiding member 7. When dust enters between them, light from the light source 2 that has been turned on is scattered around the dust, causing the dust to become visible to the observer.

In the conventional liquid crystal display device, the surfaces of the liquid crystal structure 6 and the light-guiding member 3 are in direct contact with each other. In this case, there are particularly no problems if the distances between portions of the liquid crystal structure 6 and portions of the light-guiding member 3 are equal throughout the entire region of surface contact. However, when distances vary, interference patterns or the so-called newton rings are produced, making the visible image displayed on the liquid crystal display device difficult to see.

In view of the above-described problems, it is an object of the present invention to make it possible to prevent the quality of a visible image to be displayed from being reduced as a result of entry of dust into the liquid crystal display device and as a result of non-uniform close contact between the light-guiding member and another member of the liquid crystal display device.

SUMMARY OF THE INVENTION

To these ends, according to the present invention, the liquid crystal device may have the following structures.

(1) A first liquid crystal display device of the present invention comprises a liquid crystal structure having liquid crystal filled between a pair of substrates, a light source which emits light, and a light-guiding member, disposed at the observer side of the liquid crystal structure, for guiding the light from the light source to the liquid crystal structure, wherein a spacer member is disposed between the light-guiding member and the liquid crystal structure at the peripheral portions of the light-guiding member and the liquid crystal structure so as to be in close contact with the light-guiding member and the liquid crystal structure.

In the liquid crystal display device having the above-described structure, light from the light source strikes a light-guiding member and propagates therethrough, after which it leaves the light-guiding member and illuminates a liquid crystal structure. By controlling the voltage applied to a pair of electrodes in the liquid crystal structure, the light transmission state of the light is varied, so that a visible image, such as a number or a character, is displayed as a result of contrast, resulting from varying the light transmission state.

In addition, in the liquid crystal display device, a spacer member is disposed between the light-guiding member and the liquid crystal structure at the peripheral portions thereof so as to be in close contact therewith, so that dust no longer enters between the light-guiding member and the liquid crystal structure, as a result of which the quality of a visible image to be displayed on the liquid crystal display device can be maintained at a high level over a long period of time. The spacer member also keeps the light-guiding member and the liquid crystal structure apart from each other so that they do not come into close contact with each other. Consequently, interference patterns are not produced, thus making it possible to maintain the quality of a visible image to be displayed on the liquid crystal display device at a high level.

(2) A second liquid crystal display device of the present invention comprises a liquid crystal structure having liquid crystal filled between a pair of substrates, a light source which emits light, a light-guiding member, disposed at the observer side of the liquid crystal structure, for guiding the light from the light source to the liquid crystal structure, and a cover disposed at the observer side of the light-guiding member, wherein a spacer member is disposed between the light-guiding member and the cover at peripheral portions of the light-guiding member and the cover so as to be in close contact with the light-guiding member and the cover.

The liquid crystal display device differs from the liquid crystal display device of Section (1) in that (1) a cover is disposed at the observer side of a light-guiding member, and (2) a spacer member is disposed between a light-conducting member and a cover. The cover primarily protects the liquid crystal member and the liquid crystal structure.

In the liquid crystal display device, a spacer member is disposed between a light-guiding member and a cover at the peripheral portions thereof so as to be in close contact therewith, so that dust no longer enters between the light-guiding member and the cover, as a result of which the quality of a visible image to be displayed on the liquid crystal display device can be maintained at a high level. In addition, the spacer member keeps the light-guiding member and the spacer apart from each other so that they do not come into close contact with each other. Consequently, interference patterns are not produced, thus making it possible to maintain the quality of a visible image to be displayed on the liquid crystal display device at a high level.

(3) A third liquid crystal display device according to the present invention comprises a liquid crystal structure having liquid crystal filled between a pair of substrates, a light source which emits light, a light-guiding member, disposed at the observer side of the liquid crystal structure, for guiding the light from the light source to the liquid crystal structure, and a cover disposed at the observer side of the light-guiding member, wherein the liquid crystal display device further comprises a first spacer member disposed between the light-guiding member and the liquid crystal structure at the peripheral portions of the light-guiding member and the liquid crystal structure so as to be in close contact with the light-guiding member and the liquid crystal structure, and a second spacer member disposed between the light-guiding member and the cover at the peripheral portions of the light-guiding member and the cover so as to be in close contact with the light-guiding member and the cover.

The liquid crystal display device differs from the liquid crystal display devices of Sections (1) and (2) in that spacer members are provided between the light-guiding member and the liquid crystal structure as well as between the light-guiding member and the cover. By virtue of this structure, it is possible to prevent entry of dust between the liquid crystal structure and the light-guiding member and between the light-guiding member and the cover, and to eliminate the problem of non-uniform close contact between the liquid crystal structure and the light-guiding member and between the light-guiding member and the cover, so that interference patterns of light are not produced.

(4) In the liquid crystal display devices of Sections (1) or (2), it is preferable that the spacer member be provided in at least 80% of the entire peripheral portions associated thereto. In FIG. 4, the spacer member is provided in 100% of an annular peripheral portion P of the light-guiding member 3. In FIG. 5, the spacer member is shown as being provided in at least 80% of the entire peripheral portion P of the light-guiding member 3. In this case, gaps K are formed in the spacer member in the peripheral portion P such that the portions of the spacer member remaining after the formation of these gaps K occupy at least 80% of the peripheral portion P of the light-guiding member 3. These gaps K may be formed in any location of the peripheral portion P.

The occupying area of the spacer member is set to at least 80%, based on experiments carried out by the present inventor et al. This is because when the occupying area of the spacer member is less than 80% dust enters the liquid crystal display device and reduces the display quality of the liquid crystal display device, whereas when the occupying area of the spacer member is at least 80% the amount of dust entering the liquid crystal display device can be reduced to an amount that does not, in practice, affect the display quality of the liquid crystal display device.

(5) In the liquid crystal display device of Section (3), it is preferable that the first spacer member and/or the second spacer member be provided in at least 80% of the entire peripheral portions associated thereto. The meaning of "being provided in at least 80% of the entire peripheral portions" and the reason for setting the critical values of the occupying area of the spacer member or the spacer members at 80% are as described in Section (4).

(6) In the liquid crystal display devices of Sections (1) or (2), the spacer member may be formed in an endless annular form over the entire peripheral portions associated thereto.

(7) In the liquid crystal display device of Section (3), the first spacer member and/or the second spacer member is formed in an endless annular form over the entire peripheral portions associated thereto. This can virtually completely prevent the entry of dust.

(Electronic Device)

The electronic device of the present invention is one employing any one of the liquid crystal display devices of Sections (1) to (7) as a visible image display portion. Examples thereof include a portable telephone and a portable information terminal. According to the electronic device of the present invention, the liquid crystal display device used as visible image display portion in the electronic device can prevent dust from entering between the liquid crystal member and the liquid crystal structure or between the light-guiding member and the cover, and can prevent the production of interference patterns of light by forming a gap between the liquid crystal member and the liquid crystal structure and between the light-guiding member and the cover.

BRIEF DESCRIPTION OF THE DRAWINGS

FIG. 9 is a sectional view of still another form of the light-guiding member.

FIG. 10 is a sectional view of still another form of the light-guiding member.

DETAILED DESCRIPTION OF THE PREFERRED EMBODIMENTS (First Embodiment of the Liquid Crystal Display Device)

Figure 1:
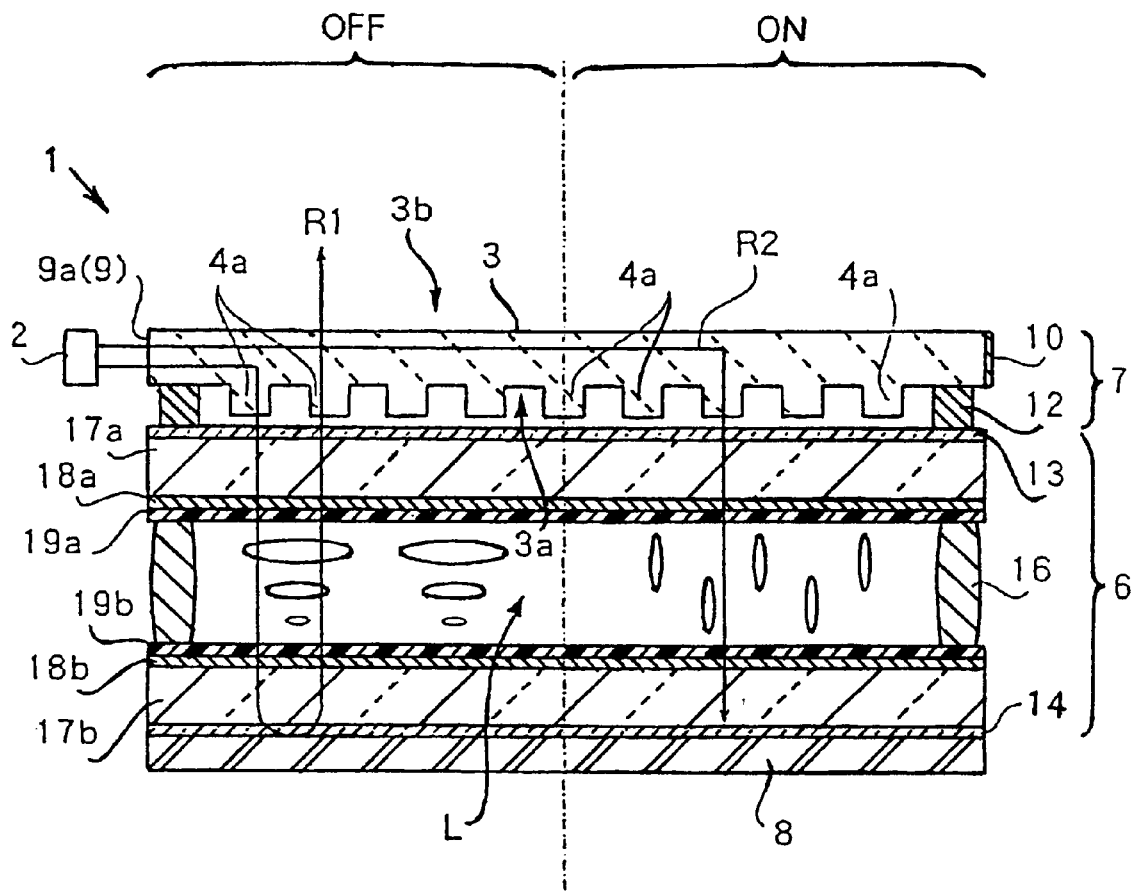
FIG. 1 is a sectional view of an embodiment of the liquid crystal display device in accordance with the present invention.

FIG. 1 illustrates an embodiment of the liquid crystal display device in accordance with the present invention. The liquid crystal display device 1 comprises a liquid crystal structure 6, consisting of a pair of electrodes 18a and 18b with liquid crystal L being filled therebetween; an illuminator, disposed at the observer side (top side in FIG. 1) of the liquid crystal structure 6; and a light reflecting plate 8, disposed at the side opposite to the observer side of the liquid crystal structure 6.

Figure 13:
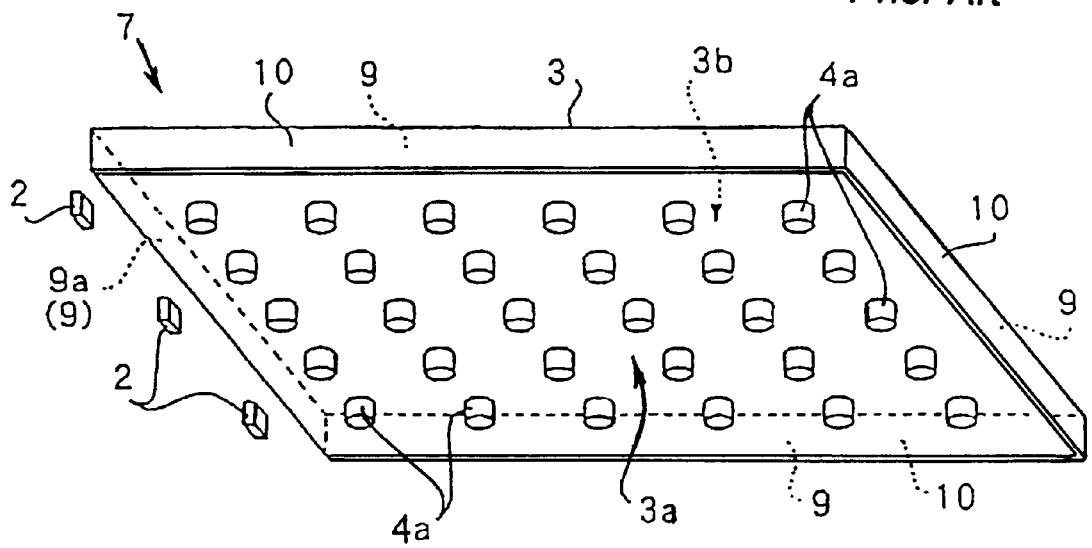
FIG. 13 is a perspective view of a form of the illuminator.

The illuminator 7 used has essentially the same structure as the illuminator of FIG. 13. The illuminator 7 comprises a plate-like, transmissive light guiding member 3, and three light sources, including LEDs (light emitting diodes) or the like, that are disposed at a side of the light-guiding member 3. The bottom side surface 3a, in FIG. 1, of the light-guiding member 3 is the light-outgoing surface, while the top side surface 3b, in FIG. 1, of the light-guiding member 3 is the observer side surface. At the light-outgoing surface 3a are provided a plurality of circular cylindrical protrusions 4a that protrude outward and are disposed regularly or irregularly like dots.

The LEDs 2 are disposed at equal distances from each other and in a row so as to oppose one of the four side end surfaces 9, that is side end surface 9a, with the four side end surfaces 9 being disposed between the observer side surface 3b and the light-outgoing surface 3a of the light-guiding member 3. A light-reflecting film 10 is affixed to the side end surfaces 9, other than the side end surface 9a.

The light-guiding member 3 may be made of (1) transmissive resin such as acrylic resin, polycarbonate resin, or noncrystalline polyolefin resin, (2) inorganic, transmissive resin, such as glass, or (3) a composite of these. Various methods may be used to produce the light-guiding member 3, which include (1) injection molding, (2) a method making use of the photosetting property of resin, (3) an etching method, and (4) a method joining a film to a flat plate made of transmissive resin or glass.

In FIG. 1, the liquid crystal structure 6 comprises a pair of transmissive substrates 17a and 17b that are bonded together by a sealant 16; liquid crystal L that fills the space between the substrates; a polarizer 13 disposed at the observer side surface of the substrate 17a; and a polarizer 14 disposed at the outer side surface of the substrate 17b. At the inner side surfaces of the substrates 17a and 17b are formed a transmissive electrode 18a and an alignment film 19a and a transmissive electrode 18b and an alignment film 19b, respectively, with the alignment films being subjected to rubbing or the like.

The substrates 17a and 17b are made of a transmissive material, such as glass, plastic, or the like. The transmissive electrodes 18a and 18b are made of, for example, ITO (indium tin oxide). The alignment films 19a and 19b are made of, for example, polyimide, polyvinyl alcohol, or the like.

Figure 4:
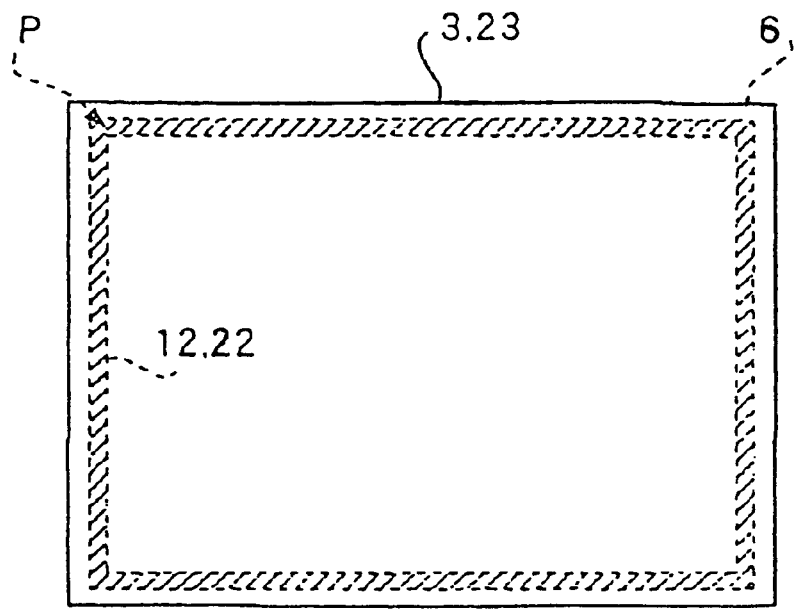
FIG. 4 is a plan view of the liquid crystal display device of FIGS. 1, 2, or 3.
Figure 5:
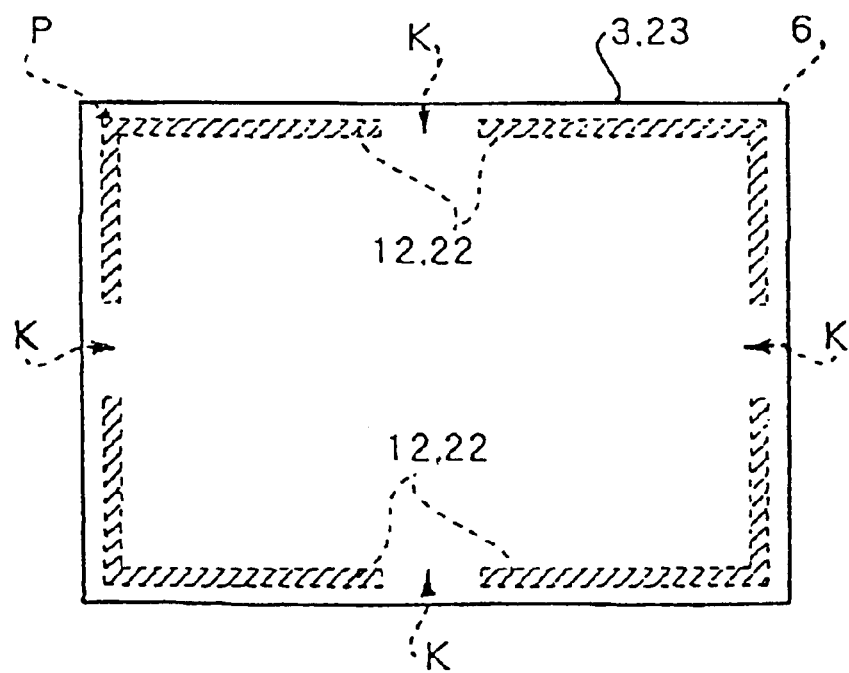
FIG. 5 is a plan view of a modification of the structure shown in FIG. 4.

In the liquid crystal display device 1 of the present embodiment, a spacer member 12 is disposed between the light-outgoing surface 3a of the light-guiding member 3 of the illuminator 7 and the polarizer 13 of the liquid crystal structure 6. The top surface of the spacer member 12 is in close contact with the light-guiding member 12, while the bottom surface of the spacer member 12 is brought into close contact with the liquid crystal structure 6. As shown in FIG. 4, the spacer member 12 is provided, in an endless annular form, in the entire peripheral portions P of the light-guiding member 3 and the liquid crystal structure 6. The spacer member 12 may be provided in part of the peripheral portions P by forming gaps in the spacer member 12 at appropriate locations in the peripheral portions P, as shown in FIG. 5. In this case, it is desirable that the spacer member 12 be formed in at least 80% of the entire peripheral portions P.

The spacer member 12 is made of a material that does not allow dust to be produced easily, such as PET (polyethylene terephthalate), epoxy resin, or, the like. The spacer 12 allows the light-guiding member 3 and the liquid crystal structure 6 to be kept at a predetermined distance apart from each other. In addition, it prevents entry of dust into the gap between the light-guiding member 3 and the liquid crystal structure 6 by shielding it from the outside.

Since the liquid crystal display device of the present embodiment has the above-described structure, when outside light, around the liquid crystal display device 1, is strong, the LEDs 2 of the illuminator 7 are turned off and outside light is allowed to strike the liquid crystal structure 6 through the light-guiding member 3. When the pixel liquid crystal portion of the liquid crystal structure 6 is in an off state, the light that has struck the liquid crystal structure 6 passes through the liquid crystal structure 6, whereas when the pixel liquid crystal portion of the liquid crystal structure 6 is in an on state, the light that has struck the liquid crystal structure 6 is absorbed by the polarizer 14 so that it does not pass therethrough.

The light that has passed through the liquid crystal structure 6 is reflected by the light reflecting plate 8 and passes through the liquid crystal structure 6 once again, after which it passes through the light-guiding member 3 of the illuminator 7 and leaves the liquid crystal display device 1, and is perceived by an observer. The observer perceives visible information, such as numbers, characters, or the like, as a result of contrast produced between the light that has passed through the light-guiding member 3 and the light that has been absorbed at the liquid crystal structure 6.

Figure 14:
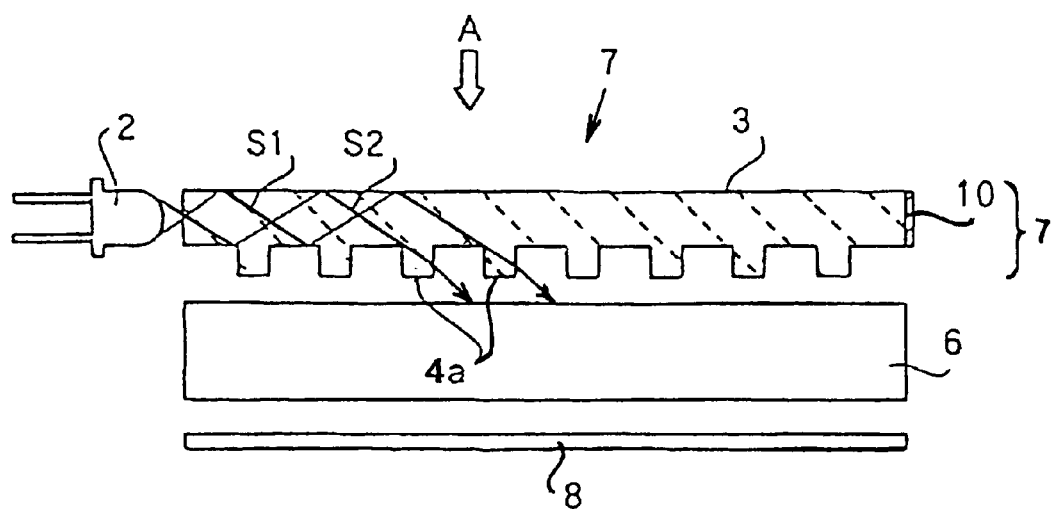
FIG. 14 is a sectional view of a conventional liquid crystal display device.

When the outside light, around the liquid crystal display device 1, is weak, so that a bright display cannot be obtained at the observer side surface (the top side surface in FIG. 1) of the liquid crystal display device 1 by the outside light alone, the LEDs 2 of the illuminator 7 are turned on. As already described with reference to FIG. 14, the light from the LEDs 2 leaves the light-outgoing surface 3a where the protrusions 4a are formed and illuminates the liquid crystal structure 6. Similarly with the case where outside light is used, visible information can be displayed at the observer side surface of the liquid crystal display device 1 by light reflected from the light reflecting plate 8 of FIG. 1. Although in FIG. 1 the paths taken by the light from the LEDs 2 are indicated schematically by arrows R1 and R2, the light travelling into the light-guiding member 3 actually takes the paths indicated by reference characters S1 and S2 of FIG. 14.

In the liquid crystal display device 1 of the present embodiment operating in the above-described way, a spacer member 12 is provided between the light-guiding member 3 and the liquid crystal structure 6 so as to be in close contact therewith. Therefore, it is possible to prevent entry of dust between the light-guiding member 3 and the liquid crystal structure 6, and thus to prevent a reduction in the quality of a visible image that is to be displayed on the liquid crystal display device. In addition, it is possible to eliminate the problem of non-uniform close contact between the light-guiding member 3 and the liquid crystal structure 6 by the spacer member 12 that keeps the light-guiding member 3 and the liquid crystal structure 6 a predetermined distance apart from each other. Consequently, interference patterns are not produced, thereby maintaining the quality of a visible image that is to be displayed on the liquid crystal display device at a high level.

(Second Embodiment of the Liquid Crystal Display Device)

Figure 2:
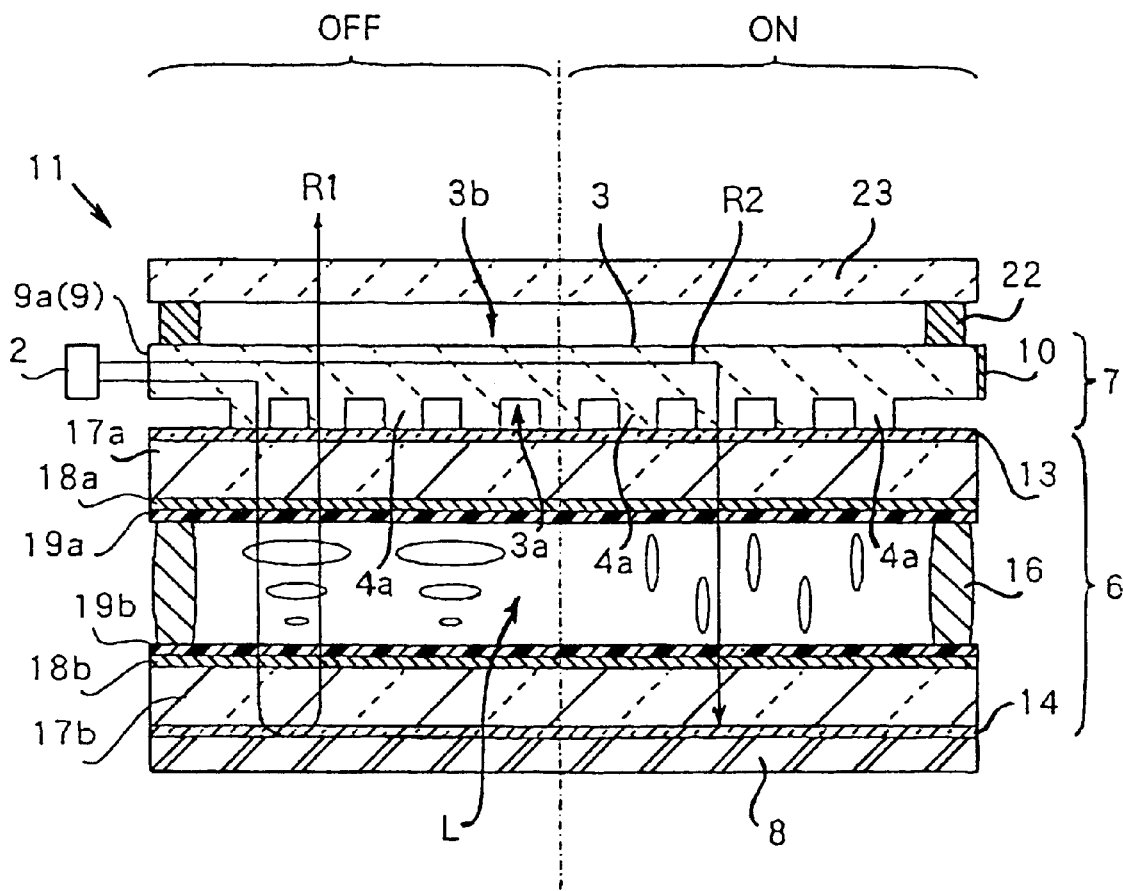
FIG. 2 is a sectional view of another embodiment of the liquid crystal display device in accordance with the present invention.

FIG. 2 illustrates another embodiment of the liquid crystal display device in accordance with the present invention. The liquid crystal display 11 of the present embodiment differs from the liquid crystal display 1 in that (1) a transmissive cover 23 is provided at the observer side (the top side of FIG. 2) of the illuminator 7, (2) a spacer member 22 is provided between the cover 23 and the light-guiding member 3, and (3) a spacer member is not provided between the light-guiding member 3 and the liquid crystal structure 6. It is to be noted that in FIG. 2 corresponding parts to those of FIG. 1 are given the same reference numerals, so that these corresponding parts are not described below.

The transmissive cover 23 is provided to protect the light-guiding member 3 and the liquid crystal structure 6 from external shock, and is ordinarily made of a transmissive and relatively hard synthetic resin or the like. As shown in FIG. 4, the spacer member 22 may be provided in the entire peripheral portions P of the cover 23 and the light-guiding member 3, or, as shown in FIG. 5, in part of the peripheral portions P, in which case it is desirable that the spacer member 22 be provided in at least 80% of the entire peripheral portions P.

As in the present embodiment, when a spacer member 22 is provided between the cover 23 and the light-guiding member 3, it is possible to prevent entry of dust between the light-guiding member 3 and the cover 23, and thus to prevent reduction in the quality of a visible image that is to be displayed on the liquid crystal display device 11. In addition, it is possible to eliminate the problem of non-uniform contact between the light-guiding member 3 and the cover 23 by the spacer member 22 that keeps the light-guiding member 3 and the cover 23 a predetermined distance apart from each other. Consequently, interference patterns are not produced, thereby maintaining the quality of a visible image that is to be displayed on the liquid crystal display device at a high level.

(Third Embodiment of the Liquid Crystal Display Device)

Figure 3:
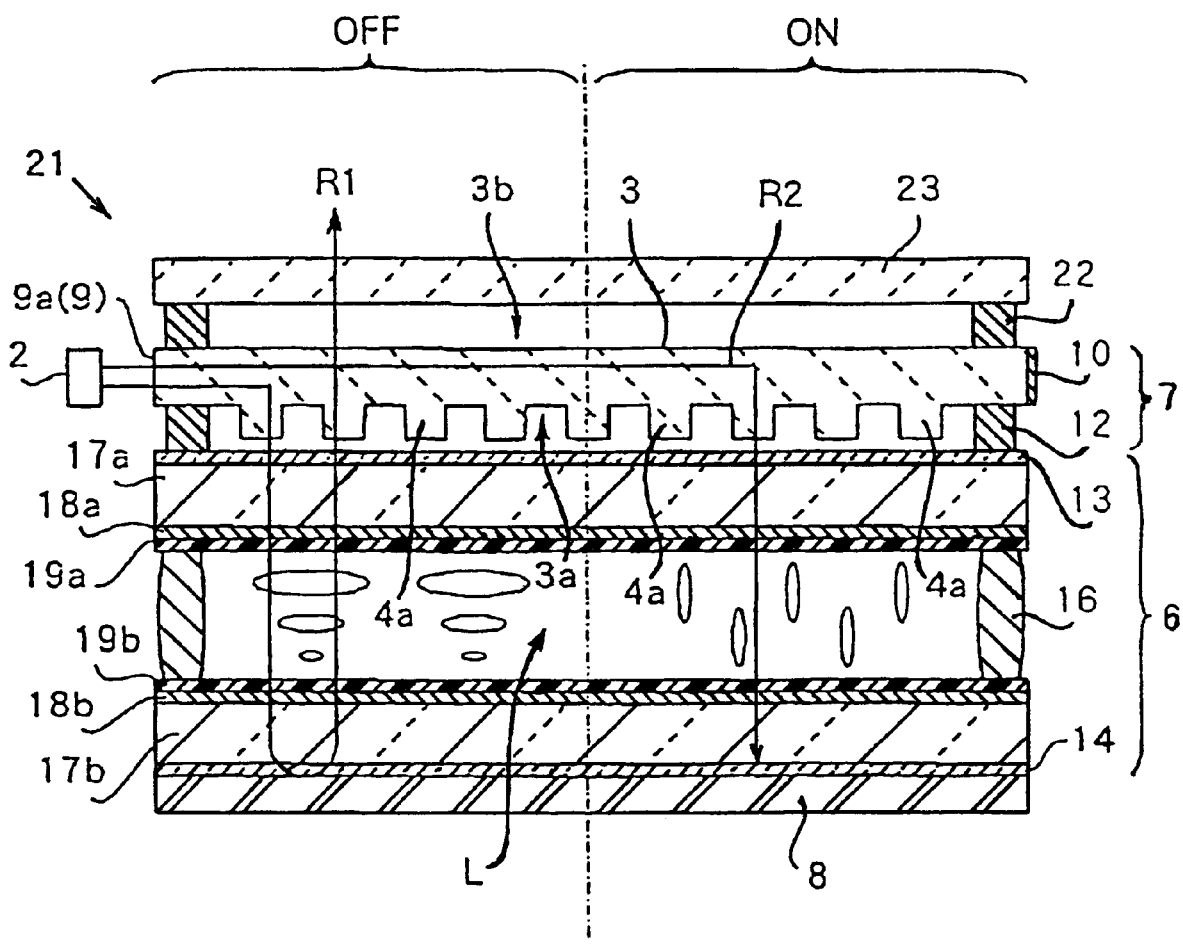
FIG. 3 is a sectional view of still another embodiment of the liquid crystal display device in accordance with the present invention.

FIG. 3 illustrates still another embodiment of the liquid crystal display device in accordance with the present invention. The liquid crystal display device 21 of the present embodiment differs from the liquid crystal display device 11 of FIG. 2 in that (1) a first spacer member 12 is disposed between the light-guiding member 3 and the liquid crystal structure 6 so as to be in close contact therewith, and (2) a second spacer member 22 is disposed between the light-guiding member 3 and the cover 23 so as to be in close contact therewith.

As shown in FIG. 4, the first spacer member 12 and the second spacer member 22 may be provided in the entire peripheral portions P of the cover 23 and the light-guiding member 3, or, as shown in FIG. 5, they may be provided in part of the entire peripheral portions P of the cover 23 and the light-guiding member 3, in which case it is desirable that they be provided in at least 80% of the entire peripheral portions P.

As in the present embodiment, when the spacer members 12 and 22 are provided between the cover 23 and the light-guiding member 3 and the light-guiding member 3 and the liquid crystal structure 6, respectively, it is possible to prevent entry of dust to the front and back sides of the light-guiding member 3, and thus to prevent a further reduction in the quality of a visible image that is to be displayed on the liquid crystal display device. In addition, it is possible to eliminate the problem of non-uniform close contact at the front and back sides of the light-guiding member 3 by the first spacer 12 that keeps the back side of the light-guiding member 3 and the liquid crystal structure 6 a predetermined distance apart from each other, and by the spacer member 22 that keeps the front side of the light-guiding member 3 and the cover 23 a predetermined distance apart from each other. Consequently, interference patterns are not produced, thereby maintaining the quality of a visible image that is to be displayed on the liquid crystal display device at a high level.

(Modifications of the Liquid Crystal Display Device)

The following modifications may be made in the above-described embodiments of the liquid crystal display device.

Figure 6:
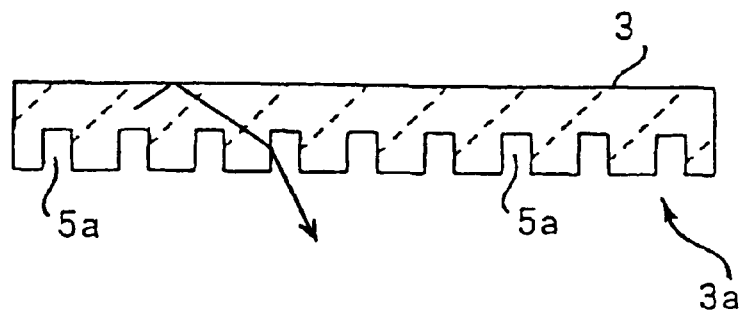
FIG. 6 is a sectional view of a form of the light-guiding member.
Figure 7:
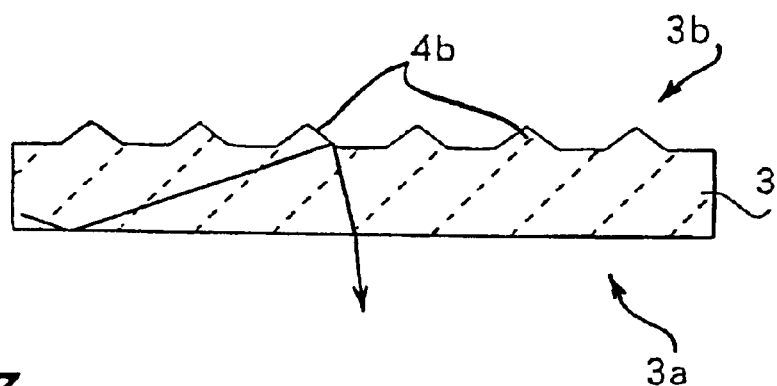
FIG. 7 is a sectional view of another form of the light-guiding member.
Figure 8:
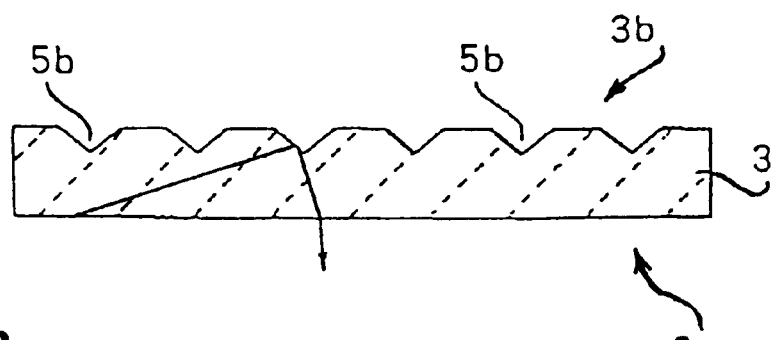
FIG. 8 is a sectional view of still another form of the light-guiding member.

(1) In the light-guiding member 3 of FIG. 1, in order to cause the light from the LEDs 2 to leave the light-outgoing surface 3a, circular cylindrical protrusions 4a were formed at the light-outgoing surface 3a. However, instead of forming these protrusions 4a, circular cylindrical recesses 5a may be formed, as shown in FIG. 6; or conical protrusions 4b may be formed at the observer side surface 3b of the light-guiding member 3, as shown in FIG. 7; or conical recesses 5b may be formed at the observer side surface 3b of the light-guiding member 3, as shown in FIG. 8; or semicircular protrusions 4c may be formed at the observer side surface 3b of the light-guiding member 3, as shown in FIG. 9; or semicircular recesses 5c may be formed at the observer side surface 3b of the light-guiding member 3, as shown in FIG. 10.

(2) Although in the embodiment of FIG. 1 the liquid crystal structure was formed using two polarizers 13 and 14, the liquid crystal structure may also be formed using only the polarizer 13. In this case, the electrode, to be formed on the transmissive substrate 17b, may be made of a material that reflects light, such as Al (aluminum), Cr (chromium), Ni (nickel), or the like. Obviously, since the electrode acts as a reflecting member, the light-reflecting member 8 of FIG. 1 is removed.

Such a structure is disclosed in, for example, Japanese Unexamined Patent Publication No. 9-258219. The reflective liquid crystal display device, having this structure, employs only one polarizer, so that it can provide a brighter display than the liquid crystal display device employing two polarizers, such as the liquid crystal display device shown in FIG. 1. When a liquid crystal display device utilizing a flow light type illuminator is used, instead of a liquid crystal display device using only one polarizer, a bright display can be obtained using the illuminator.

(3) Although in each of the above-described embodiments LEDs were used, a three band fluorescent tube may be used instead, so that the present invention may be applied to a liquid crystal display device with a large display screen.

(4) The recesses or protrusions formed in the light-guiding member of the illuminator may be disposed regularly or randomly. For example, the recesses or the protrusions may be formed such that those near the light sources are closer together while those far way from the light sources are far apart.

(5) The present invention may be applied to various liquid crystal display devices such as (1) a passive matrix addressing liquid crystal display device, (2) a liquid crystal display device with a thin film transistor, a two-terminal nonlinear element or other switching elements, and a pixel electrode, or (3) a liquid crystal display device in which liquid crystal molecules are vertically aligned. In any of the various liquid crystal display devices, when an illuminator, disposed at the observer side of the liquid crystal structure, is turned on, a bright display can be obtained even in dark places.

(Electronic Device)

Figure 11:
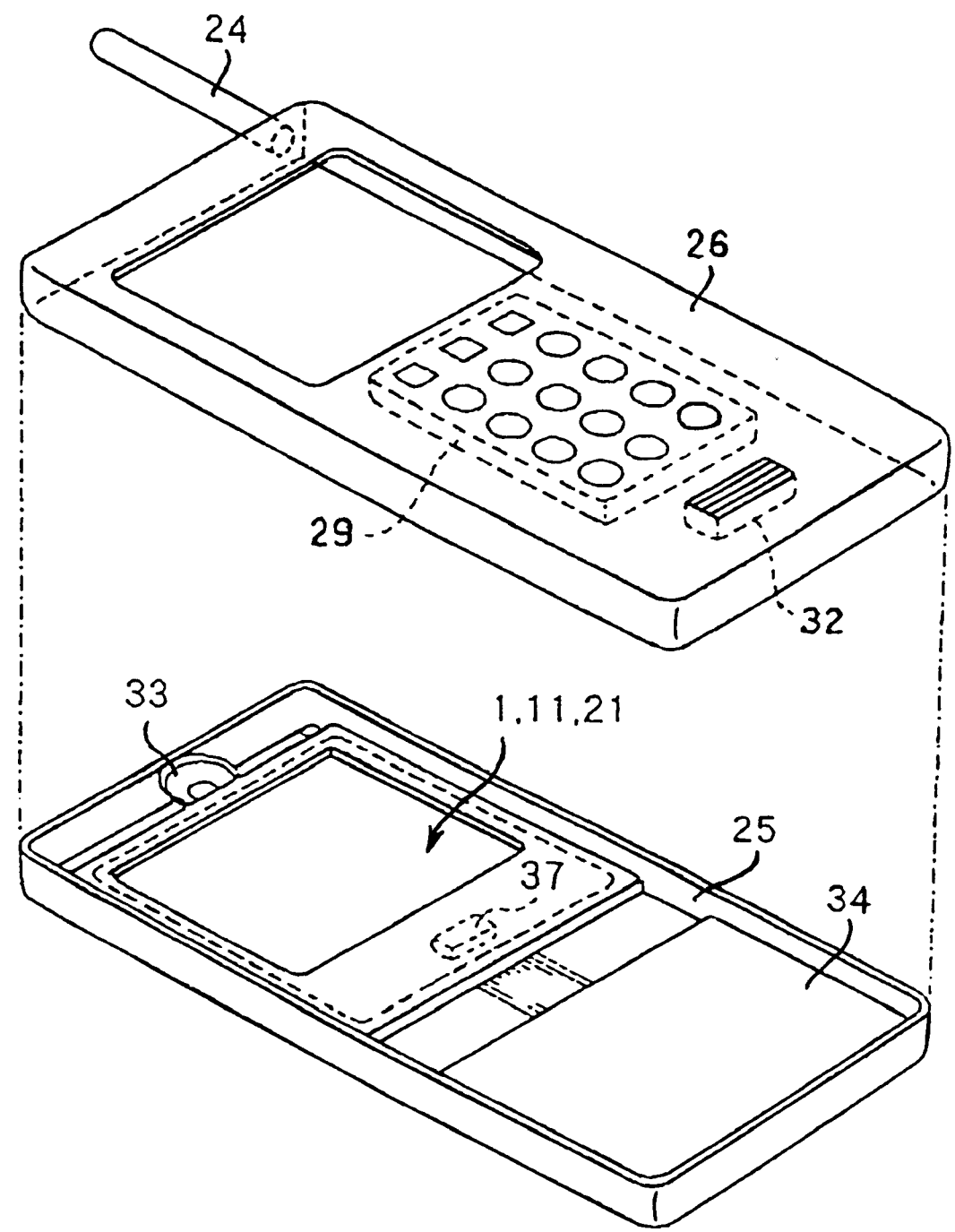
FIG. 11 is an exploded perspective view of an embodiment of the electronic device in accordance with the present invention.

FIG. 11 illustrates the case where the liquid crystal display device in accordance with the present invention is used as a display portion of a portable telephone serving as the electronic device. The portable telephone comprises a top case 26 and a bottom case 25. At the top case 26 are provided a transceiver antenna 24, a keyboard unit 29, and a microphone 32. At the bottom case 25 are provided, for example, the liquid crystal display device 1 of FIG. 1, a speaker 33, and a circuit board 34. Reference numeral 37 denotes a liquid crystal driving IC for driving the liquid crystal display device 1. It is to be noted that the liquid crystal display device 11 of FIG. 2 or the liquid crystal display device 21 of FIG. 3 may be used in place of the liquid crystal display device 1.

Figure 12:
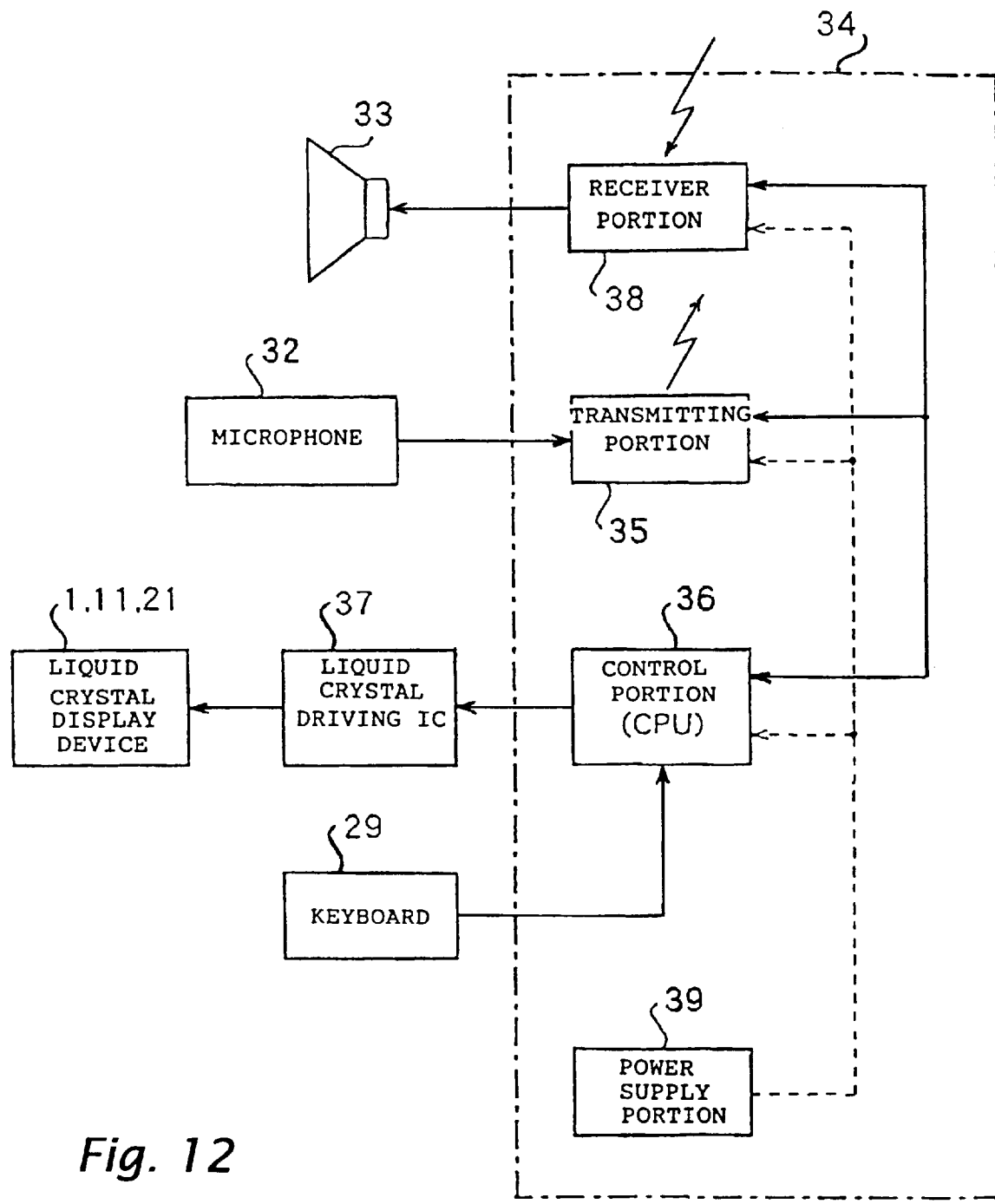
FIG. 12 is a block diagram of a form of the control system used in the electronic device of FIG. 11.

As shown in FIG. 12, on the circuit board 34 are provided a receiving portion 38 connected to an input terminal of the speaker 33, a transmitting portion 35 connected to an output terminal of the microphone 32, a control portion 36 including a CPU, and a power supply portion 39 for supplying electrical power to each of the portions. The control portion 36 reads the state of the transmitting portion 35 and the receiving portion 38, and based on the results obtained by the reading transmits information to the liquid crystal driving IC 37 in order to display visible information on the liquid crystal display device 1. Based on the information output from the keyboard unit 29, the control portion 36 causes information to be transmitted to the liquid crystal driving IC 37 in order to display visible information on the liquid crystal display device 1.

The above-described liquid crystal display devices may be applied to wristwatch type electronic devices. In addition, they may be applied to portable information processing devices, such as word processors and personal computers.

Since the various electronic devices are driven by batteries, they are ordinarily used as reflective electronic devices. Turning on the lamps, serving as light sources, only when necessary increases the life of the batteries.

(Modifications)

Although the present invention has been described with reference to the preferred embodiments, the present invention is not limited thereto, so that various modifications can be made within the scope of the invention as claimed.

In the foregoing description, recesses or protrusions were formed at the light-outgoing surface or the observer side surface opposite to the light-outgoing surface in order to cause the light, travelling into the light-guiding member from a side end surface thereof, to leave the light-outgoing surface of the light-guiding member. However, instead of forming recesses and protrusions, an area consisting of impurities with different refractive indices may be formed in the light-guiding member for the same purpose. In addition, the liquid crystal display devices of the present invention may be used as the visible image display portion of other types of electronic devices besides the portable telephone.

[Advantages]

According to the present invention, disposing a spacer member between the light-guiding member and the liquid crystal structure at the peripheral portions thereof prevents entry of dust between the light-guiding member and the liquid crystal structure, so that the quality of a visible image that is to be displayed on the liquid crystal display device can be maintained at a high level over a long period of time. The spacer member keeps the light-guiding member and the liquid crystal structure apart from each other so that they are not in close contact with each other. Therefore, it is possible to prevent the production of interference patterns, so that a high quality visible image can be displayed on the liquid crystal display device.

In addition, disposing a spacer member between the light-guiding member and the cover at the peripheral portions thereof prevents entry of dust between the light-guiding member and the cover, so that the quality of a visible image that is to be displayed on the liquid crystal display device can be maintained at a high level over a long period of time. The spacer member keeps the light-guiding member and the cover apart from each other so that they are not in close contact with each other. Therefore, it is possible to prevent the production of interference patterns, so that a high quality visible image can be displayed on the liquid crystal display device.

Further, disposing spacer members between the light-guiding member and the liquid crystal structure and between the light-guiding member and the cover prevents entry of dust between the liquid crystal structure and the light-guiding member, and between the light-guiding structure and the cover. It is also possible to prevent the production of interference patterns as a result of eliminating the problem of non-uniform close contact between the liquid crystal structure and the light-guiding member, and between the light-guiding member and the cover. As a result, it is possible to improve the quality of a visible image to be displayed on the liquid crystal display device.

What is claimed is:

1. A liquid crystal display device comprising:
   a liquid crystal structure having liquid crystal filled between a pair of substrates;
   a light source;
   a light-guiding member, disposed at the observing side of said liquid crystal structure, for guiding light from said light source toward said liquid crystal structure; and
   a spacer member positioned between said light-guiding member and said liquid crystal structure so that a gap is formed between said liquid crystal structure and said light-guiding member,
   wherein said spacer member is formed along peripheral portions of said liquid crystal structure.

2. A liquid crystal display device according to claim 1 wherein said spacer member has an opening.

3. A liquid crystal display device according to claim 1 wherein said spacer member is provided in an annular form.

4. An electronic device including said liquid crystal display device of claim 1.

5. A liquid crystal display device comprising:
   a liquid crystal structure having liquid crystal filled between a pair of substrates;
   an illuminator disposed in front of a first side of said liquid crystal structure; and
   a spacer contacting with said liquid crystal structure and said illuminator, said spacer forming a gap between said liquid crystal structure and said illuminator.
   wherein said spacer is disposed along an edge of said liquid crystal structure.

6. The liquid crystal display device of claim 5 wherein said spacer is formed annularly.

7. The liquid crystal display device of claim 5 wherein said spacer is disposed in a non-continuous pattern.

8. The liquid crystal display device of claim 7 wherein said non-continuous pattern has a spacer portion wherein said spacer is formed and an opening portion wherein said spacer is not formed, said spacer portion occupying at least 80% of said non-continuous pattern.

9. The liquid crystal display device of claim 5 further comprising:
   a cover disposed on an opposite side of said light-guiding member as said liquid crystal structure.

10. The liquid crystal display device of claim 9 further comprising:
    a second spacer disposed between a peripheral portion of said cover and said peripheral portion of said light-guiding member.

11. The liquid crystal display device of claim 10 wherein said second spacer is disposed about all of said peripheral portion of said cover and said peripheral portion of said light-guiding member.

12. The liquid crystal display device of claim 10 wherein said second spacer is disposed about part of said peripheral portion of said cover and said peripheral portion of said light-guiding member.

13. The liquid crystal display device of claim 12 wherein said part is approximately equal to 80% of said peripheral portion of said peripheral portion of said cover and said peripheral portion of said light-guiding member.

14. A liquid crystal display device comprising:
    a liquid crystal structure having liquid crystal filled between a pair of substrates;
    an illuminator disposed in front of a first side of said liquid crystal structure; and
    a plurality of spacers contacting with said liquid crystal structure and said illuminator, said spacer forming a gap between said liquid crystal structure and said illuminator,
    wherein said liquid crystal structure has a plurality of edges, and some of said spacers are arranged along some of said edges.

15. The liquid crystal display device of claim 14 wherein said illuminator comprises a light source for emitting light, and a light-guiding member having a light receiving end proximate said light source and a light emitting side for emitting said light toward said liquid crystal structure.

16. The liquid crystal display device of claim 15 wherein a plurality of protrusions are formed on said light-guiding member.

17. The liquid crystal display device of claim 14 wherein said illuminator is arranged in front of an observing side of said liquid crystal structure.

18. A liquid crystal display device comprising:
    a liquid crystal structure having a pair of substrates and liquid crystal positioned therebetween;
    an illuminator disposed in front of a first side of said liquid crystal structure; and
    a gap portion formed between said liquid crystal structure and said illuminator, said gap portion being surrounded by spacers and openings, said spacers being positioned between said liquid crystal structure and said illuminator, said openings being formed between adjacent ones of said spacers,
    wherein said spacers contact with said liquid crystal structure and said illuminator, and said spacers are provided in at least 80% of a peripheral area between said liquid crystal structure and said illuminator.

19. The liquid crystal display device of claim 18 wherein a plurality of protrusions are formed on said light-guiding member.

20. The liquid crystal display device of claim 18 wherein said illuminator is arranged at an observing side of said liquid crystal structure.

21. A liquid crystal display device comprising:
    a liquid crystal structure having liquid crystal filled between a first and a second substrate;
    an illuminator disposed in front of a first side of said first substrate;
    a reflector disposed on said second substrate; and
    a spacer positioned between said liquid crystal structure and said illuminator so that a gap is formed between said liquid crystal structure and said illuminator.

22. The liquid crystal display device of claim 21 wherein said spacer is formed along an edge of said liquid crystal structure.

23. The liquid crystal display device of claim 22 wherein said spacer is formed annularly.

24. The liquid crystal display device of claim 22 wherein said spacer is disposed in a non-continuous pattern.

25. The liquid crystal display device of claim 24 wherein said non-continuous pattern has a spacer portion wherein said spacer is formed and an opening portion wherein said spacer is not formed, said spacer portion occupying at least 80% of said non-continuous pattern.

26. A liquid crystal display device comprising:
    a liquid crystal structure having a first and a second substrate and liquid crystal positioned therebetween;
    an illuminator disposed in front of a first side of said first substrate;

a reflector disposed on said second substrate; and a plurality of spacers positioned between said liquid crystal structure and said illuminator so that a gap is formed between said liquid crystal structure and said illuminator.

27. The liquid crystal display device of claim 26 wherein said liquid crystal structure has a plurality of edges, and some of said spacers are formed along some of said edges.

28. The liquid crystal display device of claim 26 wherein said illuminator comprises a light source for emitting light, and a light-guiding member having a light receiving end proximate said light source and a light emitting side for emitting said light toward said liquid crystal structure.

29. The liquid crystal display device of claim 28 wherein a plurality of protrusions are formed on said light-guiding member.

30. A liquid crystal display device comprising:

a liquid crystal structure having liquid crystal filled between a first and a second substrate;

an illuminator disposed in front of a first side of said first substrate;

a reflector disposed on said second substrate; and a gap portion formed between said liquid crystal structure and said illuminator, said gap portion being surrounded by spacers and openings, said spacers positioned between said liquid crystal structure and said illuminator, said openings formed between adjacent ones of said spacer, wherein said spacers are provided in at least 80% of an area of said spacers and openings.

31. The liquid crystal display device of claim 30 wherein a plurality of protrusions are formed on said light-guiding member.

32. The liquid crystal display device of claim 30 wherein said illuminator is arranged at an observing side of said liquid crystal structure.

33. A liquid crystal display device comprising:

a liquid crystal structure having liquid crystal filled between a first and a second substrate;

an illuminator having a light source, and a light-guiding member having a light receiving end proximate said light source, said illuminator being disposed in front of a first side of said first substrate;

a reflector disposed on a second substrate; and a spacer positioned between said liquid crystal structure and said illuminator so that a gap is formed between said liquid crystal structure and said illuminator, wherein said spacer is disposed along an edge of said liquid crystal structure.

34. The liquid crystal display device of claim 33 wherein a plurality of protrusions are formed on said light-guiding member.

* * * * *

UNITED STATES PATENT AND TRADEMARK OFFICE
CERTIFICATE OF CORRECTION

PATENT NO. : 6,204,898 B1
DATED : March 20, 2001
INVENTOR(S) : Tsuyoshi Maeda

It is certified that error appears in the above-identified patent and that said Letters Patent is hereby corrected as shown below:

Title page (54):
Title, after "DISPLAY" insert -- DEVICE --.

Title page (30):
Priority data has been omitted; insert -- JP 10-001891(P) 01/07/1999 --

Column 1,
Line 1, after "DISPLAY" insert -- DEVICE --.

Column 9,
Line 28, "way" should be -- away --.

Signed and Sealed this

Twenty-eighth Day of August, 2001

Attest:

*Nicholas P. Godici*

NICHOLAS P. GODICI
*Attesting Officer*  *Acting Director of the United States Patent and Trademark Office*

UNITED STATES PATENT AND TRADEMARK OFFICE
CERTIFICATE OF CORRECTION

PATENT NO.    : 6,204,898 B1
DATED         : March 20, 2001
INVENTOR(S)   : Tsuyoshi Maeda It is certified that error appears in the above-identified patent and that said Letters Patent is hereby corrected as shown below:

Title page,
Item [54], Title, after "DISPLAY" insert -- DEVICE --.
Item [30], Priority data has been omitted; insert -- JP 10-001891(P) 01/07/1998 --

Column 1,
Line 1, after "DISPLAY" insert -- DEVICE --.

Column 9,
Line 28, "way" should be -- away --.

This certificate supersedes Certificate of Correction issued August 28, 2001.

Signed and Sealed this

Third Day of September, 2002

Attest:

JAMES E. ROGAN
Attesting Officer    Director of the United States Patent and Trademark Office